US011143318B2

(12) United States Patent
Goto

(10) Patent No.: US 11,143,318 B2
(45) Date of Patent: Oct. 12, 2021

(54) DIAPHRAGM VALVE AND MASS FLOW CONTROLLER USING THE SAME

(71) Applicant: Hitachi Metals, Ltd., Tokyo (JP)

(72) Inventor: Takao Goto, Mie (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 16/981,738

(22) PCT Filed: Feb. 27, 2019

(86) PCT No.: PCT/JP2019/007453
§ 371 (c)(1),
(2) Date: Sep. 17, 2020

(87) PCT Pub. No.: WO2019/181397
PCT Pub. Date: Sep. 26, 2019

(65) Prior Publication Data
US 2021/0116039 A1    Apr. 22, 2021

(30) Foreign Application Priority Data

Mar. 19, 2018 (JP) .............................. JP2018-050610

(51) Int. Cl.
*F16K 7/16* (2006.01)
*G05D 7/06* (2006.01)
(Continued)

(52) U.S. Cl.
CPC .............. *F16K 7/16* (2013.01); *G05D 7/0635* (2013.01); *F16K 31/004* (2013.01); *F16K 31/126* (2013.01); *G05D 7/06* (2013.01)

(58) Field of Classification Search
CPC ........... F16K 7/16; F16K 7/17; F16K 31/004; F16K 31/126; F16K 31/402; F16K 31/128; G05D 7/0635; G05D 7/06
(Continued)

(56) References Cited

U.S. PATENT DOCUMENTS 5,326,078 A * 7/1994 Kimura ..................... F16K 7/16
251/331
5,851,004 A * 12/1998 Wu ........................ F16K 41/12
251/331

(Continued)

FOREIGN PATENT DOCUMENTS

JP    H1165670 A    3/1999
JP    H11237921 A    8/1999
(Continued)

*Primary Examiner* — Minh Q Le
(74) *Attorney, Agent, or Firm* — Neugeboren O'Dowd PC

(57) ABSTRACT

In a diaphragm valve comprising a tubular valve seat, a primary side passage located outside the valve seat, a secondary side passage located inside the valve seat, and pressing member which presses the diaphragm to a seating surface to change a valve opening, a supporting member which contacts with the diaphragm in a valve opening range that is at least one part of an entire opening range from a fully opened state to a fully closed state to obstruct deformation of the diaphragm to the secondary side passage side is disposed in a region between the seating surface and a center of the seating surface. Thereby, even when a pressure difference between both sides of the diaphragm is large, a reduction of a gap at the seating surface can be prevented, and gas can be flowed at a large flow rate.

36 Claims, 6 Drawing Sheets

(51) Int. Cl.
*F16K 31/00* (2006.01)
*F16K 31/126* (2006.01)

(58) Field of Classification Search
USPC ........ 251/331; 137/487.5, 488, 315.05, 859;
156/345.15, 345.24, 345.26; 118/715
See application file for complete search history.

(56) References Cited

U.S. PATENT DOCUMENTS

| | | | | |
|---|---|---|---|---|
| 5,927,605 | A * | 7/1999 | Odajima | G05D 7/005 239/119 |
| 6,039,074 | A * | 3/2000 | Raaijmakers | F16K 7/16 137/511 |
| 6,786,468 | B2 * | 9/2004 | Schroeder | F16K 31/0658 251/129.17 |
| 7,150,444 | B2 * | 12/2006 | Ohmi | F16K 25/005 251/118 |
| 7,332,040 | B1 * | 2/2008 | Kojima | C23C 16/4481 118/715 |
| 8,162,286 | B2 * | 4/2012 | Sawada | F16K 31/007 251/129.06 |
| 8,602,052 | B2 * | 12/2013 | Keeper | F16K 7/16 137/315.27 |
| 2005/0092079 | A1 * | 5/2005 | Ales | F16K 7/17 73/270 |
| 2005/0109973 | A1 * | 5/2005 | Glime | F16K 7/16 251/331 |
| 2006/0118752 | A1 * | 6/2006 | Tin-Kai | F16K 1/425 251/331 |
| 2008/0142091 | A1 | 6/2008 | Meinig et al. | |
| 2012/0223265 | A1 * | 9/2012 | Sawada | F16K 7/16 251/263 |
| 2014/0103240 | A1 * | 4/2014 | Glime, III | F16K 1/04 251/265 |
| 2014/0217321 | A1 * | 8/2014 | Glime | C02F 1/722 251/331 |
| 2014/0374634 | A1 * | 12/2014 | Ohtsuki | F16K 31/007 251/129.06 |
| 2015/0369378 | A1 * | 12/2015 | Umeyama | F16K 7/123 137/486 |
| 2016/0047483 | A1 * | 2/2016 | Hirose | F16K 27/0236 137/602 |
| 2016/0053899 | A1 * | 2/2016 | Glime | F16K 7/16 251/331 |
| 2016/0341330 | A1 * | 11/2016 | Sneh | F16K 7/16 |
| 2017/0115150 | A1 * | 4/2017 | Ikeuchi | G01F 5/00 |
| 2017/0152954 | A1 * | 6/2017 | Watanabe | F16K 7/16 |
| 2020/0400246 | A1 * | 12/2020 | Chen | F16K 7/16 |
| 2021/0018103 | A1 * | 1/2021 | Yakushijin | F16K 7/17 |

FOREIGN PATENT DOCUMENTS

| | | |
|---|---|---|
| JP | 2002195443 A | 7/2002 |
| JP | 2014047843 A | 3/2014 |
| WO | 2006101857 A2 | 9/2006 |
| WO | 2017217179 A1 | 12/2017 |

* cited by examiner

US 11,143,318 B2

DIAPHRAGM VALVE AND MASS FLOW CONTROLLER USING THE SAME

FIELD

The present invention relates to a diaphragm valve and a mass flow controller using the same.

BACKGROUND

A mass flow controller is an apparatus which comprises a flow sensor and a flow control valve and adjusts an opening of the flow control valve such that a flow rate of a gas measured by the flow sensor is in agreement with a target value. A mass flow controller has been widely used for the purpose of supplying a gas as a film forming material to semiconductor manufacturing equipment at a fixed feed rate. Some gases used for manufacturing a semiconductor are corrosive. For this reason, in a mass flow controller, it is common that a diaphragm valve in which a passage of a gas and a driving mechanism of a valve are airtightly separated by a metal barrier (namely, a diaphragm) is used as a flow control valve.

Typically, the diaphragm of the diaphragm valve is a thin plate in a circular shape constituted by corrosion-resistant metal, such as stainless steel. A switching action of the diaphragm valve is performed by contacting a surface of the diaphragm to a seating surface of a valve seat separating a primary side passage and a secondary side passage of the valve and detaching the surface of the diaphragm from the seating surface. Displacement of the diaphragm is performed by a pressing member prepared on an opposite side of the passage of a gas across the diaphragm.

The maximum flow rate of the diaphragm valve is dependent on a pressure difference $\Delta P1$ between a primary side pressure P1 and a secondary side pressure P2 of a valve and a cross section S of a gap formed between the seating surface of the valve seat and the surface of the diaphragm. Typically, the valve seat has a cylindrical shape and its annular end surface on a side of the diaphragm becomes the seating surface. Therefore, in order to increase the maximum flow rate when the pressure difference $\Delta P1$ is constant, it is effective to increase a cross section S of the gap ($=l \times d$) by either means of lengthening a peripheral length l of the seating surface of the valve seat and extending a distance d between the seating surface of the valve seat and the surface of the diaphragm. The distance d in the latter means is determined by the size of a motion range of the pressing member of the diaphragm. When a driving mechanism which drives the pressing member is a piezo-electric element, the motion range of the pressing member is at most 50 micrometers, and it is difficult to extend the distance d.

On the other hand, as a flow control valve in which the maximum flow rate is increased by adopting the former means, a flow control valve in which a seating surface of a valve seat is extended to the vicinity of a periphery of a flat part of a diaphragm is described Japanese Patent Application Laid-Open (kokai) No. H11-65670 (PTL1), for example. In accordance with this configuration, the peripheral length l of the seating surface becomes the longest as a valve seat which has a single seating surface with respect to a diaphragm having a flat part of a fixed size.

By the way, in recent years, types of gases as film forming materials have been increasing in association with progress of a semiconductor manufacturing technology, and special gases which had not been used conventionally are used increasingly. For example, gases which contain precursors, such as an organic metallic compound and/or a metal halide, are described as film forming materials used for an atomic layer depositing method (ALD) in International Patent Publication No. WO2006/101857 (PTL2), for example. An atomic layer of metal or a metallic oxide, etc., is formed by carrying out chemical adsorption of these precursors on a substrate first to form a monolayer and making it react with another gas thereafter.

SUMMARY

According to an aspect, a diaphragm valve is disclosed, which comprises a circular diaphragm, a valve seat including a tubular member disposed coaxially with said diaphragm and having a seating surface formed on an end surface on the diaphragm side of said tubular member, and said seating surface being a plane having an annular shape on which said diaphragm is seated. The diaphragm valve also includes a primary side passage that is a space located outside said valve seat, a secondary side passage that is a space located inside said valve seat, and a pressing member configured so as to press said diaphragm to bring said diaphragm closer to said seating surface. A periphery part of said diaphragm is fixed at a reference position a predetermined distance apart from a seating plane that is a plane including said seating surface, and said pressing member is configured so as to press said diaphragm and thereby change the distance between said diaphragm and said seating surface to change a valve opening of said diaphragm valve. Said diaphragm valve further comprises a supporting member configured so as to contact with said diaphragm in a first opening range that is at least one part of a range of the valve opening within an entire opening range that is a range of the valve opening of said diaphragm valve from a fully opened state to a fully closed state to obstruct deformation of said diaphragm to the side of said secondary side passage, and said supporting member is configured such that a supporting surface that is a surface of said supporting member, which contacts with said diaphragm in said first opening range, is located in a region between a seating center that is a center of the annular shape of said seating surface and said seating surface, in a normal projection to said seating plane.

Another aspect may be characterized as a mass flow controller including a flow sensor and the above-described diaphragm valve.

DETAILED DESCRIPTION

Technical Problem

Figure 1:
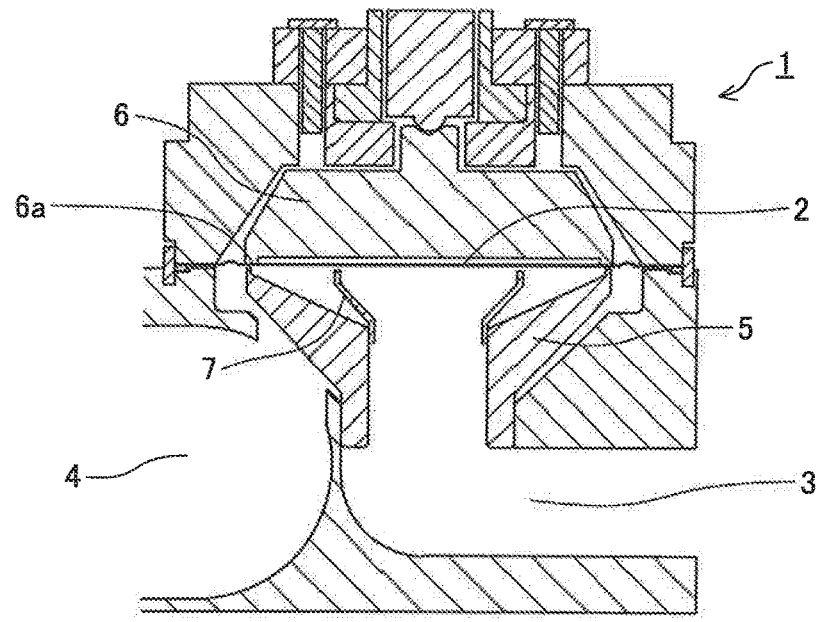
FIG. 1 is a schematic sectional view for showing an example of a configuration of a diaphragm valve according to a first embodiment of the present invention (first valve).

Generally, the above-mentioned precursors, such as an organic metallic compound and a metal halide, have a large molecular weight, and are liquids (or solids) at an ordinary temperature and a normal pressure. Moreover, even though the precursors have been vaporized by heating, the precursors easily liquefy (or solidify) in association with temperature fall or pressure rise since its equilibrium vapor pressure is low. Therefore, in order to control flow rates of these gases and supply them to a semiconductor manufacturing equipment while preventing liquefaction (or solidification) of these gases, it is necessary to perform flow rate control while maintaining a temperature T at a high temperature and maintaining a state where the primary side pressure P1 and the secondary side pressure P2 do not exceed the equilibrium vapor pressure P (T) at the temperature T. This means that the pressure difference ΔP1 between the primary side pressure P1 and the secondary side pressure P2 cannot be increased (since the equilibrium vapor pressure P (T) is low). Therefore, in order to attain a desired flow rate in flow control of a gas having a low equilibrium vapor pressure, it is necessary to increase the cross section S of the gap of the diaphragm valve which the mass flow controller comprises.

In the flow control valve in which the seating surface of the valve seat is extended to the vicinity of the periphery of the flat part of the diaphragm described in the Patent Document 1 (PTL1), the peripheral length l of the seating surface and the cross section S of the gap are the maximum as a valve seat which has a single seating surface with respect to a diaphragm having a flat part of a fixed size. However, since a shape of its secondary side passage is complicated, fluid resistance becomes larger and a coefficient of capacity (Cv value) becomes smaller. For this reason, a problem that a flow rate cannot be increased even though the cross section S of the gap is large occurs.

Then, it is possible to reverse a flow direction of a gas, arrange the primary side passage outside the valve seat, and dispose the secondary side passage inside the valve seat. However, since the secondary side passage is connected with the semiconductor manufacturing equipment in that case, a pressure therein becomes close to a vacuum. Namely, the secondary side pressure P2 of the gas supplied to semiconductor manufacturing equipment is low. On the other hand, in the diaphragm valve, since a space on the pressing member side of the diaphragm is in communication with the outside, the pressure P0 in that space is equal to atmospheric pressure. For this reason, a central part of the diaphragm deforms (expands) toward the secondary side passage according to the pressure difference ΔP2 between the pressure P0 on the side where the pressing member is disposed and the secondary side pressure P2 on the opposite side, and this causes a new problem that the distance d of the gap is shortened under that effect to decrease the flow rate of the gas.

Figure 10:
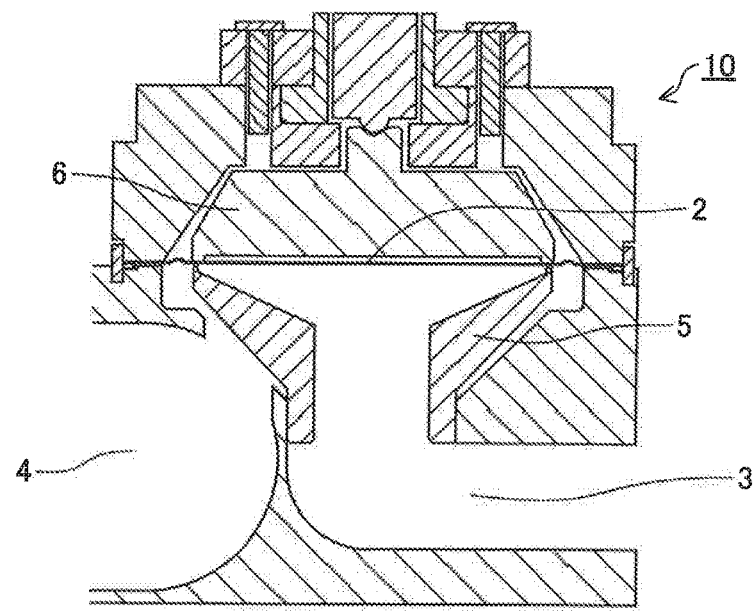
FIG. 10 is a schematic sectional view for showing an example of a configuration of a diaphragm valve according to a conventional technology (conventional valve).
Figure 11:
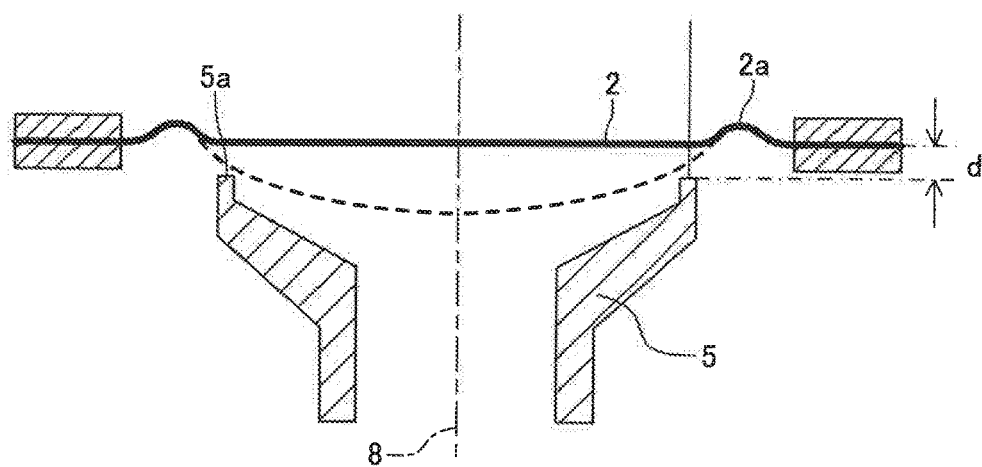
FIG. 11 is a schematic partial enlarged sectional view of a vicinity of a diaphragm for explaining a change of a state of the diaphragm according to magnitude of the pressure difference ΔP2 in the conventional valve.

FIG. 10 is a schematic sectional view for showing an example of a configuration of a diaphragm valve according to a conventional technology (which may be referred to as a "conventional valve" hereafter). Moreover, FIG. 11 is a schematic partial enlarged sectional view of a vicinity of the diaphragm 2 for explaining a change of a state of the diaphragm 2 according to magnitude of the above-mentioned pressure difference ΔP2 in the conventional valve 10. In both drawings, hatched areas represent cross sections of members constituting the conventional valve 10. However, only a cross section of the diaphragm 2 is expressed by a bold line. Areas with neither a line nor a hatching represent a passage of a gas or a gap between the members.

When the pressure difference ΔP2 between the pressure P0 on the pressing member 6 side of the diaphragm 2 and the secondary side pressure P2 on its opposite side is sufficiently small, the flat part of the diaphragm 2 maintains its original flat shape like the bold solid line shown in FIG. 11. However, when the pressure difference ΔP2 is large, the diaphragm 2 may deform toward the secondary side passage like the bold broken line shown in FIG. 11 (the diaphragm 2 may warp such that its secondary side passage side becomes convex). Since a periphery part of the diaphragm 2 is fixed to another member, as compared with the center part of the diaphragm 2, deformation at a position corresponding to the seating surface 5a is smaller. However, as exemplified in FIG. 11, as compared with a case where the pressure difference ΔP2 is sufficiently small (bold solid line), the distance d of the gap between the diaphragm 2 shown by the bold broken line and the seating surface 5a of the valve seat 5 becomes smaller. As a result of such a deformation of the diaphragm 2, the cross section S of the gap becomes smaller and the flow rate of the gas falls.

The present invention has been conceived in view of the above-mentioned problems, and one objective of the present invention is to make it possible for a gas to flow at a large flow rate even in a case where the pressure difference ΔP2 between both sides of a diaphragm is large, in a diaphragm valve which comprises a valve seat having a seating surface expanded to a vicinity of a periphery of a flat part of the diaphragm and a mass flow controller using the same.

Solution to Problem

A diaphragm valve according to the present invention (which may be referred to as a "present invention valve" hereafter) comprises a circular diaphragm, a valve seat, a primary side passage that is a space located outside the valve seat, a secondary side passage that is a space located inside the valve seat, and a pressing member configured so as to press the diaphragm to bring the diaphragm closer to a seating surface. The valve seat is constituted by a tubular member disposed coaxially with the diaphragm and the seating surface is formed on an end surface on the diaphragm side of the tubular member, and the seating surface is a plane having an annular shape on which the diaphragm is seated. A periphery part of the diaphragm is fixed at a reference position a predetermined distance apart from a seating plane that is a plane including the seating surface, and the pressing member is configured so as to press the diaphragm and thereby change the distance between the diaphragm and the seating surface to change a valve opening of the diaphragm valve.

The present invention valve further comprises a supporting member configured so as to contact with the diaphragm in a first opening range that is at least one part of a range of the valve opening within an entire opening range that is a range of the valve opening of the diaphragm valve from a fully opened state to a fully closed state to obstruct deformation of the diaphragm to the side of the secondary side passage. The supporting member is configured such that a supporting surface that is a surface of the supporting member, which contacts with the diaphragm in the first opening range, is located in a region between a seating center that is a center of the annular shape of the seating surface and the seating surface, in a normal projection to the seating plane that is a plane including the seating surface.

Moreover, a (the) mass flow controller according to the present invention (which may be referred to as a "present invention apparatus" hereafter) is a flow controller which comprises a flow sensor and the present invention valve.

Advantageous Effects of Invention

In accordance with the present invention, fluid resistance can be reduced by expanding the secondary side passage. In addition, even when a pressure difference ΔP2 between a pressure P0 on the side where the pressing member is disposed and the secondary side pressure P2 on the opposite side is large, a decrease in the distance d of a gap of the diaphragm valve can be suppressed. Therefore, by using the mass flow controller which comprises the present invention valve, a gas having a low equilibrium vapor pressure can be stably supplied to semiconductor manufacturing equipment, etc., at a large flow rate.

DESCRIPTION OF EMBODIMENTS

Some embodiments of the present invention will be explained in detail below referring to drawings. However, the embodiments described here are merely exemplifications and embodiments of the present invention are not limited to the embodiments described here.

First Embodiment

Figure 2:
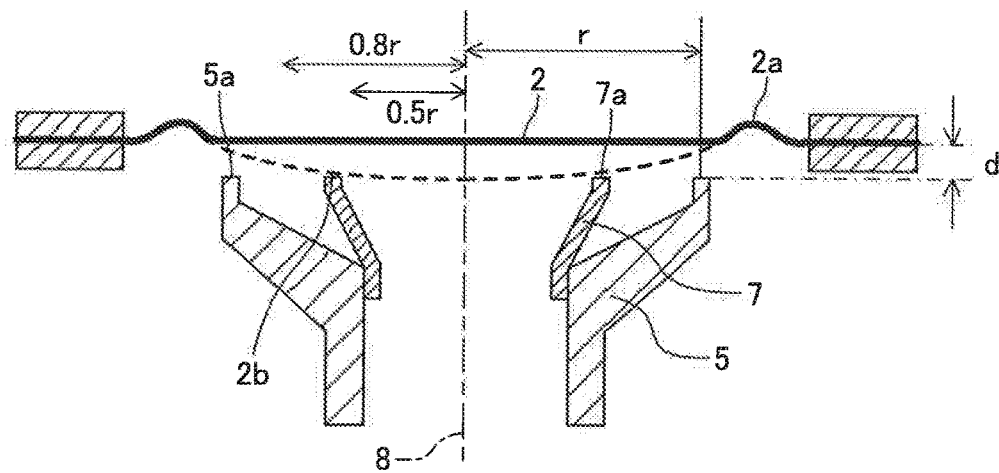
FIG. 2 is a schematic partial expanded sectional view of a vicinity of a diaphragm for explaining a change of a state of the diaphragm according to magnitude of the pressure difference $\Delta P2$ in the first valve.

FIG. 1 is a schematic sectional view for showing an example of a configuration of a diaphragm valve according to a first embodiment of the present invention (which may be referred to as a "first valve" hereafter). Hatched areas represent cross sections of members constituting the first valve 1. However, only a cross section of a diaphragm 2 is expressed by a bold line. Areas with neither a line nor a hatching represent a passage of a gas or a gap between the members. Moreover, FIG. 2 is a schematic partial expanded sectional view of a vicinity of the diaphragm 2 for explaining a change of a state of the diaphragm 2 according to magnitude of the pressure difference ΔP2 in the first valve 1.

The first valve 1 has the circular diaphragm 2. The diaphragm 2 is a barrier constituted by a thin metal plate having a circular shape. One of two principal surfaces of the diaphragm 2 faces a passage of a gas, and the other faces a space in communication with the open air. Therefore, the gas and the open air are isolated from each other by the diaphragm 2. A periphery part of the diaphragm 2 is fixed at a reference position a predetermined distance apart from a seating plane that is a plane including the seating surface. Specifically, the periphery part of the diaphragm 2 is fixed to another member with no clearance. It is preferable that the fixed portion of the diaphragm 2 and the member is maintained airtight by a gasket or other means such that the gas may not leak out. It is preferable that a bending part 2a for facilitating a switching action and an adjustment (increase and decrease) of a valve opening of the first valve 1 by deformation of the diaphragm 2 is prepared a little inside the fixed portion of the diaphragm 2.

It is preferable that the diaphragm 2 is constituted by a thin plate of corrosion-resistant metal, such as stainless steel. Thereby, it becomes possible to control a flow rate of a gas corrosive to metal using the first valve 1. It is preferable that the thickness of the thin metal plate constituting the diaphragm 2 is 0.2 mm or more and 0.5 mm or less. When the thickness of the diaphragm 2 is 0.2 mm or more, the strength of the diaphragm 2 becomes sufficient, and when it is 0.5 mm or less, deformation (driving) of the diaphragm 2 by a pressing member becomes easier. The more preferable thickness of the diaphragm 2 is 0.3 mm or more and 0.4 mm or less.

The first valve 1 comprises a valve seat 5 constituted by a tubular member disposed coaxially with the diaphragm 2 and having a seating surface 5a formed on an end surface on the diaphragm 2 side of the tubular member, and the seating surface 5a is a plane having an annular shape on which the diaphragm 2 is seated. A shape of the tubular member which constitutes the valve seat 5 is not limited in particular as long as the seating surface 5a is a plane which has an annular shape. For example, the shape of the tubular member may be a cylinder type or truncated cone tubular type. Alternatively, as shown in FIG. 1, the tubular member may be constituted by a combination of a cylindrical member and a truncated cone tubular member.

A space to serve as a primary side passage 4 of a gas is defined outside the valve seat 5, and a space to serve as a secondary side passage 3 is defined inside the valve seat 5. The gas flows into the first valve 1 through the primary side passage 4, and flows out of the first valve 1 to the outside through the secondary side passage 3. It is preferable that shapes of both the primary side passage 4 and the secondary side passage 3 have as large passage areas as possible and as few bending parts as possible such that fluid resistance of the gas is decreased. The primary side passage 4 and the secondary side passage 3 can be constituted by a hole bored (drilled) by machining in a member which constitutes the first valve 1, for example.

The switching action of the first valve 1 is performed by contacting a surface of the diaphragm 2 to the seating surface 5a of the valve seat 5 and detaching the surface of the diaphragm 2 from the seating surface 5a. When the surface of the diaphragm 2 has been detached from the seating surface 5a of the valve seat 5, a gap with an almost constant distance is formed between the surface of the diaphragm 2 and the annular seating surface 5a. When the pressure difference ΔP1 between the primary side pressure P1 and the secondary side pressure P2 of the first valve 1 is constant, the flow rate of the gas which flows through the first valve 1 is dependent on the product of the distance d of the gap and the peripheral length l of the seating surface 5a, namely the cross section S (=l×d) of the gap.

Since the distance d of the gap is determined by the size of a motion range of a pressing member 6 of the diaphragm 2 as mentioned above, it is not easy to extend the distance d. The seating surface 5a of the valve seat 5 of the first valve 1 has an annular shape. By making the shape of the seating surface 5a annular, a certain switching action of the first valve 1 becomes possible. Moreover, it is preferable to expand the seating surface 5a of the valve seat 5 to a vicinity of a periphery of a flat part (flat area on a central side of a center from the bending part 2a) of the diaphragm 2. Thereby, the peripheral length l of the seating surface 5a and the cross section S of the gap can be maximized.

When the surface of the diaphragm 2 is in contact with the seating surface 5a of the valve seat 5, the primary side passage 4 and the secondary side passage 3 are intercepted (insulated) at a position of the seating surface 5a, and the gas does not flow. A passage of the gas on the upstream side from the seating surface 5a at this time is referred to as the primary side passage 4, and a passage of the gas on the downstream side from the seating surface 5a at this time is referred to as the secondary side passage 3. As exemplified in FIG. 1, the primary side passage 4 may be constituted not only by a hole bored in a member which constitutes the first valve 1 by machining, but also by an outer surface of the tubular member which constitutes the valve seat 5. Moreover, the secondary side passage 3 may be constituted not only by a hole bored in a member which constitutes the first valve 1 by machining, but also by a space (hole) inside the tubular member which constitutes the valve seat 5.

As exemplified in FIG. 1, the seating surface 5a of the valve seat 5 can be prepared on an end surface on the diaphragm 2 side of the tubular member which constitutes the valve seat 5. The seating surface 5a is prepared in a single plane in order to ensure close contact with the diaphragm 2.

The first valve 1 comprises the pressing member 6 configured so as to press the diaphragm 2 to bring the diaphragm 2 closer to the seating surface 5a. The pressing member 6 may have any configuration as long as the pressing member 6 can be driven by a driving mechanism to press the diaphragm 2 to bring the diaphragm 2 closer to the seating surface 5a. For example, as exemplified in FIG. 1, the pressing member 6 may have an annular convex part 6a corresponding to the shape of the seating surface 5a of the valve seat 5. The pressing member 6 which has such a shape is preferable since the pressing member 6 can certainly press the diaphragm 2 against the seating surface 5a of the valve seat 5 by the convex part 6a. The driving mechanism which drives the pressing member 6 can include either means of a piezo-electric element driven with an electric voltage signal or a solenoid driven with an electric current signal, for example. These means are preferable since they can control the distance d of the gap according to strength of the signal.

As mentioned above, the periphery part of the diaphragm 2 is fixed at a reference position a predetermined distance apart from a seating plane that is a plane including the seating surface 5a. The distance to the reference position from the seating plane can be properly determined according to a flow rate of a gas required when the first valve 1 is fully opened, for example. The pressing member 6 is configured so as to press the diaphragm 2 and thereby change the distance between the diaphragm 2 and the seating surface 5a to change the valve opening of the first valve 1.

The first valve 1 further comprises a supporting member 7 configured so as to contact with the diaphragm 2 in a first opening range that is at least one part of a range of the valve opening within an entire opening range that is a range of the valve opening of the first valve 1 from a fully opened state to a fully closed state to obstruct deformation of the diaphragm 2 to the side of the secondary side passage 3. The supporting member 7 is configured such that a supporting surface 7a that is a surface of the supporting member 7, which contacts with the diaphragm 2 in the first opening range, is located in a region between a seating center that is a center of the annular shape of the seating surface 5a and the seating surface 5a, in a normal projection to the seating plane.

As mentioned above, a pressure in the secondary side passage 3 may become close to a vacuum since the secondary side passage 3 is connected with semiconductor manufacturing equipment. In such a case, in the diaphragm valve according to a conventional technology (conventional valve), the diaphragm 2 deforms (expands) such that the central part of the diaphragm 2 warps to be convex toward the secondary side passage 3 according to the pressure difference $\Delta P2$ between the pressure P0 on the side where the pressing member 6 is disposed and the pressure P2 on the side of the secondary side passage 3. As a result of this, the distance d of the gap is shortened to unexpectedly decrease the flow rate of the gas, as explained referring to FIG. 10 and FIG. 11.

On the other hand, in accordance with the first valve 1, since the above-mentioned deformation of the diaphragm 2 to the side of the secondary side passage is obstructed by the supporting member 7, the decrease in the distance d of the gap and the decrease in the flow rate of the gas can be reduced. An action of the supporting member 7 in the first valve 1 will be explained further in detail using the partial expanded sectional view showing in FIG. 2. When the pressure difference $\Delta P2$ between both sides of the diaphragm 2 is not large (is sufficiently small), the shape of the diaphragm 2 is flat as shown by the bold solid line in FIG. 11. A distance of the gap between the surface of the diaphragm 2 and the seating surface 5a of the valve seat 5 at this time is a distance shown with a symbol d. Moreover, when the radius of the seating surface 5a which has an annular shape is represented by r, the peripheral length l of the seating surface 5a is equal to $2\pi r$. Therefore, the cross section S of the gap is $2\pi r \times d$. The distance d of the gap can be changed by driving the pressing member 6 with a driving mechanism, which is not shown, to press the diaphragm 2 such so that the diaphragm 2 is brought close to the seating surface 5a of the valve seat 5, while maintaining a flat shape of the diaphragm 2.

On the other hand, when a difference between the pressure P0 on the pressing member 6 side and the pressure P2 in the secondary side passage 3 becomes large (the pressure difference $\Delta P2$ becomes large) due to a decrease in the pressure P2 of the secondary side passage 3, etc., for example, the diaphragm 2 deforms and expands as shown by the bold broken line in FIG. 2. However, in the first valve 1, when the surface of the deformed and expanded diaphragm 2 contacts with a tip (supporting surface 7a) of the supporting member 7, it becomes impossible for the diaphragm 2 to deform further. As a result, the distance d of the gap in the first valve 1 when the pressure difference $\Delta P2$ is large is larger than the distance d of the gap in the conventional valve 10 when the pressure difference $\Delta P2$ is large (refer to the bold broken line in FIG. 2 and FIG. 11). Namely, the decrease in the distance d of the gap and the decrease in the flow rate of the gas in association with the same can be reduced.

By the way, in the art, for the purpose of preventing excessive deformation of a diaphragm, a diaphragm valve with a projection part prepared so as to contact with a central part of a surface of a diaphragm on a side opposite to a pressing member has been known (see, Japanese Patent Application Laid-Open (kokai) No. 2014-47843 (PTL3), for example). Moreover, for the purpose of increasing restoring force against pressing force by a pressing member in the latter half of a process in which a diaphragm deforms to a fully closed state from a fully opened state, a diaphragm valve with a stopper disposed so as to contact with a central part of a surface of a diaphragm on a side opposite to a pressing member has been known (see, United States Patent Application Publication No. 2008/0142091 (PTL4), for example).

It is considered that it is possible to obstruct the deformation of the diaphragm 2 due to the pressure difference $\Delta P2$ between the both sides of the diaphragm 2 to some extent by preparing a supporting member so as to contact with a central part of the diaphragm 2 as mentioned above. However, in a case where the supporting member contacts with only the central part of the diaphragm to support the diaphragm, there is a possibility that the diaphragm may warp between the central part and the peripheral part of the diaphragm and it may become difficult to reduce the decrease in the distance d of the gap when the pressure difference $\Delta P2$ is large. This problem becomes remarkable when a diameter of the seating surface of the valve seat is increased for the purpose of increasing the maximum flow rate of the diaphragm valve.

However, the supporting member 7 which the first valve 1 comprises is configured such that a supporting surface 7a that is a surface of the supporting member 7, which contacts with the diaphragm 2 in the first opening range, is located in a region between a seating center that is a center of the annular shape of the seating surface 5a and the seating surface 5a, in a normal projection to the seating plane. Thereby, the diaphragm 2 can be certainly prevented from warping between the center and a peripheral part of the diaphragm 2, and the decrease in the distance d of the gap can be suppressed certainly.

Second Embodiment

As mentioned above, in the first valve 1, further deformation of the diaphragm 2 is prevented by contacting the surface of the diaphragm 2, which has been deformed (expanded) so as to be convex toward the secondary side passage, to the supporting surface 7a of the supporting member 7, and thereby the decrease in the distance d of a gap and the flow rate of the gas in association with the same is reduced.

However, in a case where the supporting surface 7a is located at a position closer to the diaphragm 2 than a seating plane that is a plane including the seating surface 5a, the supporting surface 7a contacts with the diaphragm 2 excessively prior to the seating surface 5a of the valve seat 5 when the diaphragm valve 1 is going to be closed. For this reason, for example, the diaphragm 2 is prevented from being seated on the seating surface 5a and/or bent unexpectedly, and an unintended influence is given to the flow rate of the gas. On the contrary, in a case where the supporting surface 7a is located at a position further from the diaphragm 2 than the seating surface 5a (namely, on the side of the secondary side passage), the effect to obstruct the deformation of the diaphragm 2 cannot be demonstrated sufficiently. Therefore, it is preferable that the position of the supporting surface 7a of the supporting member 7 which can contact with the diaphragm 2 is located coplanarly with the seating surface 5a and of the valve seat 5.

Then, in the diaphragm valve according to a second embodiment of the present invention (which may be referred to as a "second valve" hereafter), the supporting surface 7a is included in the seating plane. In other words, as shown in FIG. 2, the supporting surface 7a of the supporting member 7 which can contact with the diaphragm 2 is located coplanarly with the seating surface 5a of the valve seat 5 in the second valve. In addition, in the example shown in FIG. 2, the position 2b is the position where the diaphragm 2 can contact with the supporting surface 7a of the supporting member 7.

In accordance with the second valve, the effect to obstruct the deformation of the diaphragm 2 can be demonstrated sufficiently to certainly reduce the decrease in the distance d of the gap, while avoiding that the supporting surface 7a contacts with the diaphragm 2 excessively prior to the seating surface 5a of the valve seat 5 to give an unintended influence to the flow rate of the gas.

In addition, the "coplanarly" as used in the present invention does not necessarily mean being geometrically located in a coplanar completely, but dimensional tolerance which cannot be avoided in a manufacturing process of the members when applying the present invention is allowed.

Third Embodiment

By the way, in the second valve, the supporting surface 7a of the supporting member 7 which can contact the diaphragm 2 is located coplanarly with the seating surface 5a of the valve seat 5, as mentioned above. Thereby, the effect to obstruct the deformation of the diaphragm 2 due to the pressure difference $\Delta P2$ can be demonstrated sufficiently to certainly reduce the decrease in the distance d of the gap, while avoiding that the supporting surface 7a contacts with the diaphragm 2 excessively prior to the seating surface 5a of the valve seat 5 to give an unintended influence to the flow rate of the gas.

However, since the supporting surface 7a is located coplanarly with the seating surface 5a, the diaphragm 2 can deform so as to be convex toward the secondary side passage until the diaphragm 2 contacts with the supporting surface 7a, except for a case where the second valve is in the fully closed state. Therefore, in order to more certainly reduce the decrease in the distance d of the gap in association with the deformation of the diaphragm 2 due to the pressure difference $\Delta P2$ between both sides of the diaphragm 2, it is necessary to more certainly reduce the deformation of the diaphragm 2 in states other than the fully closed state.

Therefore, in the diaphragm valve according to a third embodiment of the present invention (which may be referred to as a "third valve" hereafter), the pressing member is configured such that an opposite surface that is a surface of a region opposite at least to the supporting surface is located coplanarly with a region opposite to the seating surface. Although a specific shape of such a pressing member is not limited in particular, the surface on the diaphragm side of the pressing member may be a plane opposite to the surface of the diaphragm in a parallel fashion, for example. Alternatively, when the pressing member has an annular convex part corresponding to the shape of the seating surface of the valve seat as mentioned above, a further convex part which has a top surface in the same plane as the surface of the above-mentioned convex part, which is opposite to the diaphragm, may be prepared on a surface on the diaphragm side of the pressing member.

Furthermore, the supporting member comprises an energizing member which energizes the supporting surface toward the pressing member, and is configured such that the diaphragm is sandwiched between the supporting surface and the opposite surface by energization force from the energizing member. A configuration of the energizing member is not limited in particular as long as the supporting surface can be energized toward the pressing member against force of the diaphragm pressing the supporting surface (pressing force) to sandwich the diaphragm between the supporting surface and the opposite surface. For example, the energizing member may be constituted by an elastic material and configured so as to energize the whole supporting member to the side of the pressing member by pressing an end surface of the supporting member opposite to the pressing member. In this case, the supporting member is configured so as to be able to displace in a direction of a seating axis that is an axis which intersects perpendicularly with the above-mentioned seating plane at the above-mentioned seating center (namely, a direction of the switching action of the diaphragm valve by the pressing member). Other examples of specific configurations of the energizing member will be mentioned later in an explanation about other embodiments of the present invention.

Figure 3:
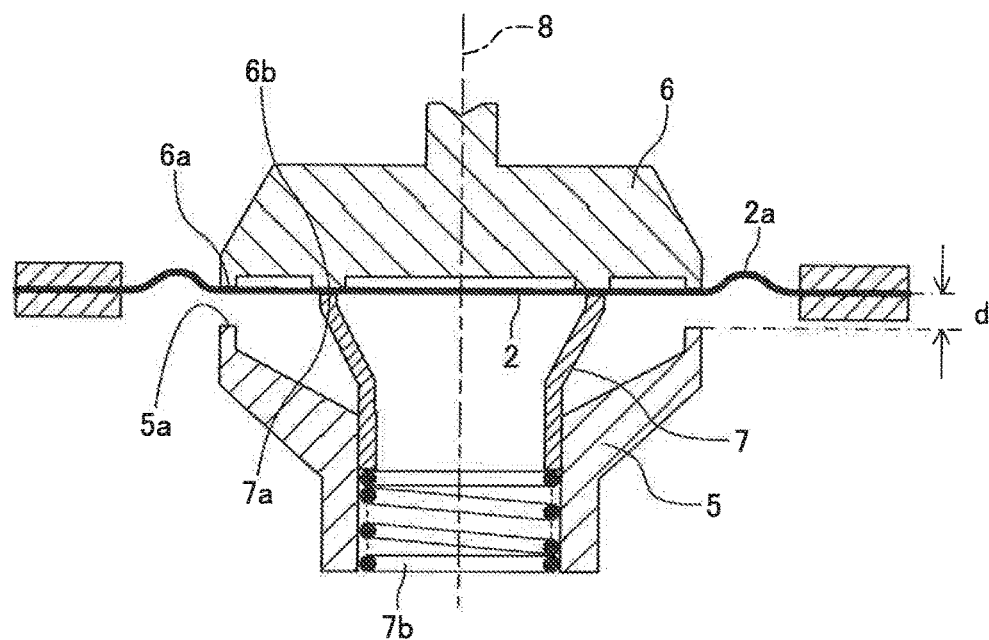
FIG. 3 is a schematic partial expanded sectional view for showing an example of a configuration of a vicinity of the diaphragm of a diaphragm valve according to a third embodiment of the present invention (third valve).

FIG. 3 is a schematic partial expanded sectional view for showing an example of a configuration of a vicinity of the diaphragm of the third valve. In the pressing member 6 shown in this example, the opposite surface 6b is prepared on a surface of the pressing member 6 opposite to the supporting surface 7a of the supporting member 7. The top surface of this opposite surface 6b is configured so as to be located coplanarly with the top surface of the convex part 6a prepared on the surface of the pressing member 6, which is opposite to the seating surface 5a of the valve seat 5. On the other hand, the supporting member 7 is configured so as to able to displace in the direction of the seating axis 8 along an inner wall of the secondary side passage which is an interior space of the valve seat 5. Furthermore, a spring as the energizing member 7b is disposed on the opposite side of the pressing member 6 in the supporting member 7, and thereby the supporting surface 7a (of the supporting member 7) is energized so as to approach the pressing member 6.

In accordance with the configuration as mentioned above, in the third valve, the diaphragm 2 is sandwiched and held between the supporting surface 7a and the opposite surface 6b with the energization force by the energizing member 7b regardless of the valve opening. Therefore, not only as compared with a diaphragm valve according to a conventional technology (conventional valve), but also as compared with the above-mentioned first valve or second valve, the decrease in the distance d of the gap in association with the deformation of the diaphragm 2 to the side of the secondary side passage due to the pressure difference ΔP2 between both sides of the diaphragm 2 can be reduced more certainly.

Fourth Embodiment

As mentioned above, the supporting member 7 which the first valve comprises is configured such that the supporting surface 7a that is the surface of the supporting member 7, which contacts with the diaphragm 2 in the first opening range, is located in a region between the seating center that is the center of the annular shape of the seating surface 5a and the seating surface 5a, in a normal projection to the seating plane. Thereby, the diaphragm 2 can be certainly prevented from warping between the center and the peripheral part of the diaphragm 2, and the decrease in the distance d of the gap can be reduced certainly.

As a result of further investigation, the present inventor has found that the diaphragm 2 can be more certainly prevented from warping between the center and the peripheral part of the diaphragm 2 by configuring the supporting member 7 such that the supporting surface 7a is located in a predetermined range in a region between the seating center and the seating surface 5a in the normal projection to the seating plane.

Then, in the diaphragm valve according to a fourth embodiment of the present invention (which may be referred to as a "fourth valve" hereafter), the supporting member is configured such that a center of the supporting surface in a radial direction of the annular shape of the seating surface (supporting surface center) is located in a region whose distance from the above-mentioned seating center is 0.5r or more and 0.8r or less, in which r is an average radius that is an average of an outer radius and an inner radius of the annular shape of the seating surface, in a normal projection to the above-mentioned seating plane.

In FIG. 2 referred to in the explanation of the above-mentioned first valve 1, the above-mentioned average radius r and the distances (0.5r and 0.8r) from the seating center (the seating axis 8 in FIG. 2) are indicated two direction arrows respectively. When the distance to the above-mentioned "supporting surface center" from the seating center in the normal projection to the seating plane is 0.5r or more, the deformation of the diaphragm 2 due to the above-mentioned pressure difference ΔP2 can be prevented more effectively. On the contrary, when the distance is less than 0.5r, there is a possibility that a part between the center and the peripheral part of the diaphragm 2 may warp and deform since the position of the supporting surface 7a which contacts with the supporting member 7 is close to the center of the diaphragm 2 (the seating center, the seating axis 8).

Moreover, when the supporting distance is larger than 0.8r, there is a high possibility that the flow of the gas which passes the gap from the primary side passage 4 to flow into the secondary side passage 3 may be obstructed and/or disturbed due to the existence of the supporting member 7, thereby fluid resistance may be increased, and a capacity coefficient (Cv value) may become large since the position of the supporting surface 7a is close to the seating surface 5a of the valve seat 5. On the other hand, when a supporting distance is below 0.8r, the above-mentioned problem is reduced since the position of the supporting surface 7a is more distant from the seating surface 5a of the valve seat 5 as compared with the above. Therefore, it is preferable that the above-mentioned supporting distance is in a range of 0.5r or more and 0.8r or less. More preferably, the range is 0.6r or more and 0.7r or less.

In the present invention, the "average radius r of the seating surface" is an average of the outer radius and the inner radius of the annular shape of the seating surface 5a, as mentioned above. In other words, when the seating surface 5a has a width in its radial direction, the average radius r means a radius at a center of the width. Similarly, when the supporting surface 7a has a width in its radial direction, the "supporting surface center" means the center of the supporting surface in its radial direction of the annular shape of the seating surface 5a.

<<Supporting Member>>

Here, preferred embodiments of the supporting members 7 which the diaphragm valves according to various embodiments of the present invention (present invention valve) comprise will be explained in detail below, referring to drawings.

<Configuration Example 1 of Supporting Member>

In a preferred embodiment of the present invention, the supporting member is constituted by one planar member or two or more planar members including a seating axis that is an axis which intersects perpendicularly with the above-mentioned seating plane at the above-mentioned seating center.

Figure 4:
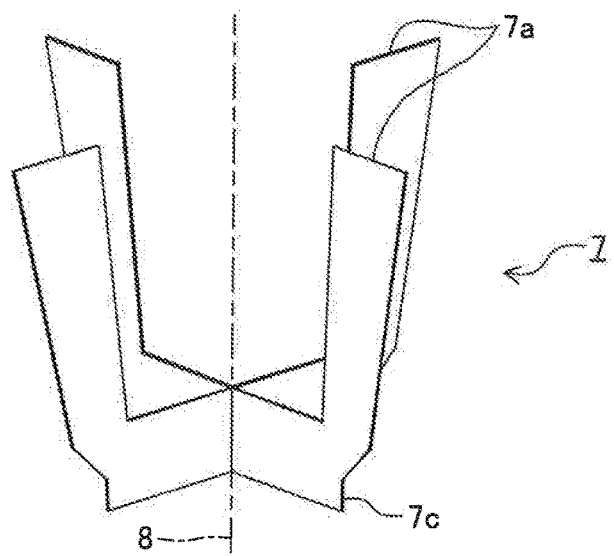
FIG. 4 is a schematic perspective view for showing an embodiment of a supporting member according to the present invention.

FIG. 4 is a schematic perspective view for showing a shape of the supporting member 7 in the above-mentioned embodiment. In the example shown in this perspective view, the supporting member 7 has a shape in which four planar members are radially connected at a common axis as a center such that angles formed between adjacent planar members are 90 degrees. Namely, the four planar members which constitute the supporting member 7 include the common axis, and the supporting member 7 is mounted in a predetermined position in the secondary side passage 3 of the valve seat 5 such that this axis is in agreement with the above-mentioned seating axis 8. The supporting member 7 can be fixed and positioned by well-known techniques such as fitting a cut-out part 7c in the internal diameter of the valve seat 5, for example.

The supporting member 7 exemplified in FIG. 4 is constituted such that edges 7a of the four planar members can contact with the diaphragm 2. Moreover, since each of the planar members is arranged so as to include the seating axis 8, the planar members are parallel to a flow direction of the gas flowing into the secondary side passage 3 from the gap, and does not obstruct the flow of the gas greatly. Namely, the possibility that the flow of the gas which passes the gap from the primary side passage 4 to flow into the secondary side passage 3 may be obstructed and/or disturbed due to the existence of the supporting member 7, thereby fluid resistance may be increased, and a capacity coefficient (Cv value) may become large can be reduced by having such a configuration.

In addition, in the example shown in FIG. 4, regions on the seating axis 8 side (regions on the central side of the diaphragm 2) of the edges on the diaphragm 2 side of the four planar members constituting the supporting member 7 is lopped. Thereby, the supporting surface 7a that is the surface of the supporting member 7 which contacts with the diaphragm 2 in the first opening range can be configured so as to be located in the region between the seating center that is the center of the annular shape of the seating surface 5a and the seating surface 5a in the normal projection to the seating plane.

Moreover, by lopping the regions on the seating axis 8 side of the edges on the diaphragm 2 side of the four planar members as mentioned above, the surface area of the supporting member which contacts with the gas immediately after passing the gap from the primary side passage 4 to flow into the secondary side passage 3 can be decreased. As a result, decrease in the capacity coefficient (Cv value) of the diaphragm valve in association with increase in fluid resistance due to the supporting member 7 can be reduced.

Furthermore, in the example shown in FIG. 4, four planar members are radially connected at a common axis as a center such that angles formed between adjacent planar members are 90 degrees. However, the number and layout of planar members which constitute the supporting member 7 are not limited to the above, as long as it is possible to reduce the deformation of the diaphragm 2 due to the pressure difference $\Delta P2$ between both sides of the diaphragm 2.

<Configuration Example 2 of Supporting Member>

Configurations of the supporting member is not limited to the configuration exemplified in FIG. 4, and the supporting member can have various configurations as long as it is possible to effectively obstruct the deformation of the diaphragm 2 due to the pressure difference $\Delta P2$ between both sides of the diaphragm 2. For example, the supporting surface of the supporting member can may an annular shape formed coaxially with the seating surface in a normal projection to the seating plane.

For example, when the tubular member which constitutes the valve seat is constituted by a cylindrical member and/or a truncated cone tubular member disposed coaxially with the diaphragm, the supporting member may be constituted by a cylindrical member and/or a truncated cone tubular member disposed coaxially with the tubular member. In this case, it is preferable that a through hole is formed in a side surface of the tubular member or the truncated cone tubular member which constitutes the supporting member such that the flow of the gas which flows into the secondary side passage from the gap is not obstructed greatly.

Figure 5:
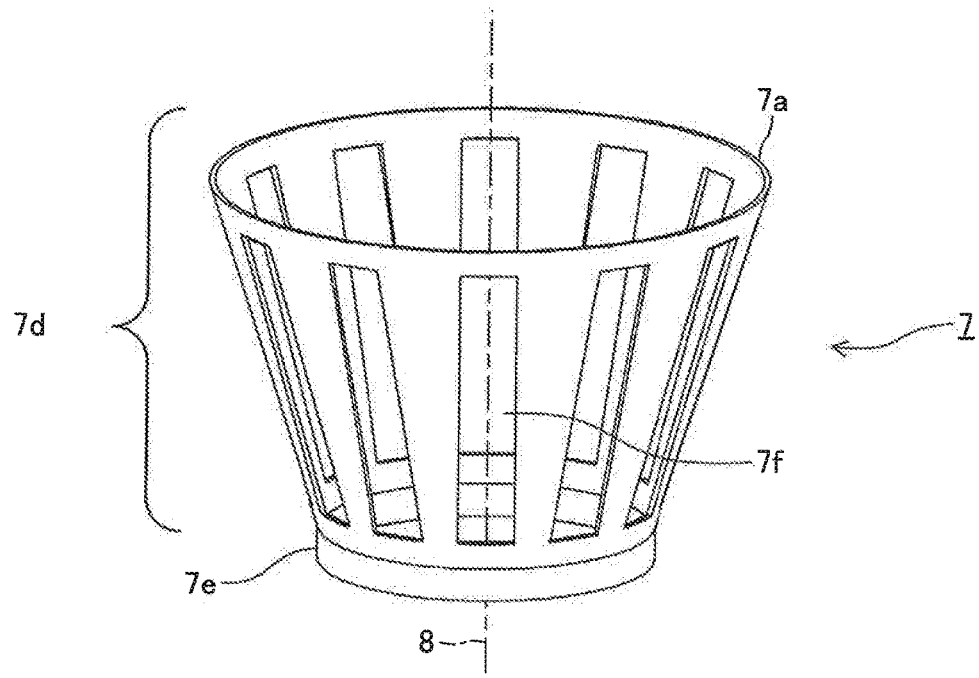
FIG. 5 is a schematic perspective view for showing another embodiment of a supporting member according to the present invention.

FIG. 5 is a schematic perspective view for showing a shape of the supporting member 7 according to the above-mentioned embodiment. In this perspective view, the supporting member 7 is constituted by a reverse truncated cone tubular member 7d and a cylindrical member 7e, and is configured such that one edge of the reverse truncated cone tubular member 7d functions as the supporting surface 7a which can contact with the diaphragm 2. In a side surface of the reverse truncated cone tubular member 7d, a plurality of through holes 7f are formed such that the flow of the gas which flows into the secondary side passage 3 from the gap is not obstructed greatly. Moreover, the cylindrical member 7e is continuously formed at the edge on the opposite side of the supporting surface 7a of the reverse truncated cone tubular member 7d, and is configured so as to be mounted at a predetermined position of the secondary side passage 3 of the valve seat 5 which is not shown.

In addition, a main part of the supporting member 7 may be constituted by a combination of the reverse truncated cone tubular member 7d and the cylindrical member 7e as exemplified in FIG. 5, or may be constituted by a cylindrical member which has the same diameter as that of the secondary side passage 3 of the valve seat 5. The supporting member 7 according to such an embodiment can prevent the deformation of the diaphragm 2 more strongly, since the whole supporting member 7 is formed integrally.

<Configuration Example 3 of Supporting Member>

In the supporting member 7 exemplified in FIG. 5, the reverse truncated cone tubular part which has the supporting surface 7a is supported by parts of the side surface of the reverse truncated cone tubular member 7d, in which the through holes 7f are not formed. However, the structure for supporting a part which has the supporting surface 7a is not limited to the above, as long as the deformation of the diaphragm 2 can be prevented effectively.

Figure 6:
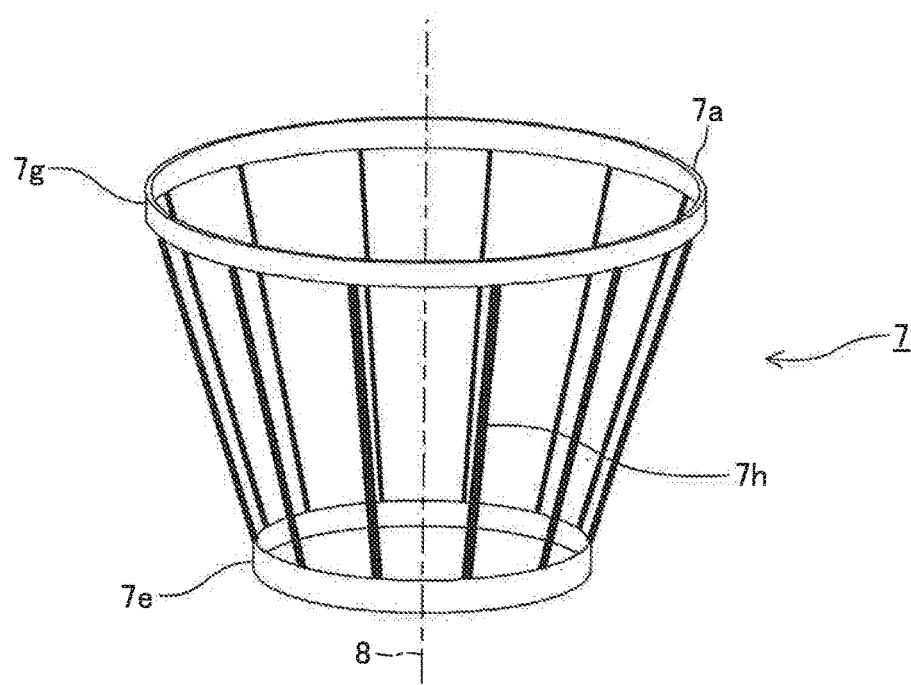
FIG. 6 is a schematic perspective view for showing further another embodiment of a supporting member according to the present invention.

FIG. 6 is a schematic perspective view for showing an example of a configuration of a supporting member according to further another embodiment of the present invention. In the supporting member 7 exemplified in FIG. 6, a cylindrical member 7g which has the supporting surface 7a opposite to the diaphragm 2 and another cylindrical member 7e are connected by a plurality of linear members 7h (bold solid lines) arranged in a truncated cone tubular shape between these two cylindrical members 7g and 7e. These linear members 7h are constituted by a material which can support the cylindrical member 7g to effectively prevent the deformation of the diaphragm 2. As a specific example of such a linear member 7h, steel materials, such as bar steel, can be mentioned, for example.

In accordance with the above-mentioned configuration, since large through holes 7h can be secured, the possibility that the flow of the gas which has flowed into the secondary side passage from the gap may be obstructed and/or disturbed, thereby fluid resistance may be increased, and a capacity coefficient (Cv value) may become large can be reduced effectively. The supporting member 7 which has such a configuration also corresponds to an example of the supporting member constituted by a cylindrical member and/or a truncated cone tubular member.

Configuration Example 4 of Supporting Member>

By the way, as mentioned above, the supporting member which the diaphragm valve according to the present invention (present invention valve) comprises may comprise the energizing member which energizes the supporting surface toward the pressing member side. As explained referring to FIG. 3 about the diaphragm valve according to the third embodiment of the present invention (third valve), this energizing member can be constituted by an elastic body (for example, a spring, etc.) as an energizing member disposed on the opposite side to the pressing member of the supporting member. However, configurations of the supporting member which comprises the energizing member are not limited to the above, as long as it is possible to energize the supporting surface so as to approach the pressing member.

For example, in the configuration example 1 exemplified in FIG. 4, a plurality of the planar members which constitute the supporting member 7 may be formed by a material, such as spring steel, which can deform elastically. In this case, the supporting surface 7a can be energized so as to approach the pressing member by the planar members being warped elastically. Moreover, in the configuration example 3 exemplified in FIG. 6, the linear members 7h may be formed by a material, such as spring steel, which can deform elastically. In this case, the supporting surface 7a can be energized so as to approach the pressing member by the supporting surface 7a being pressed and the linear members 7h being warped elastically.

<Configuration Example 5 of Supporting Member>

Figure 7:
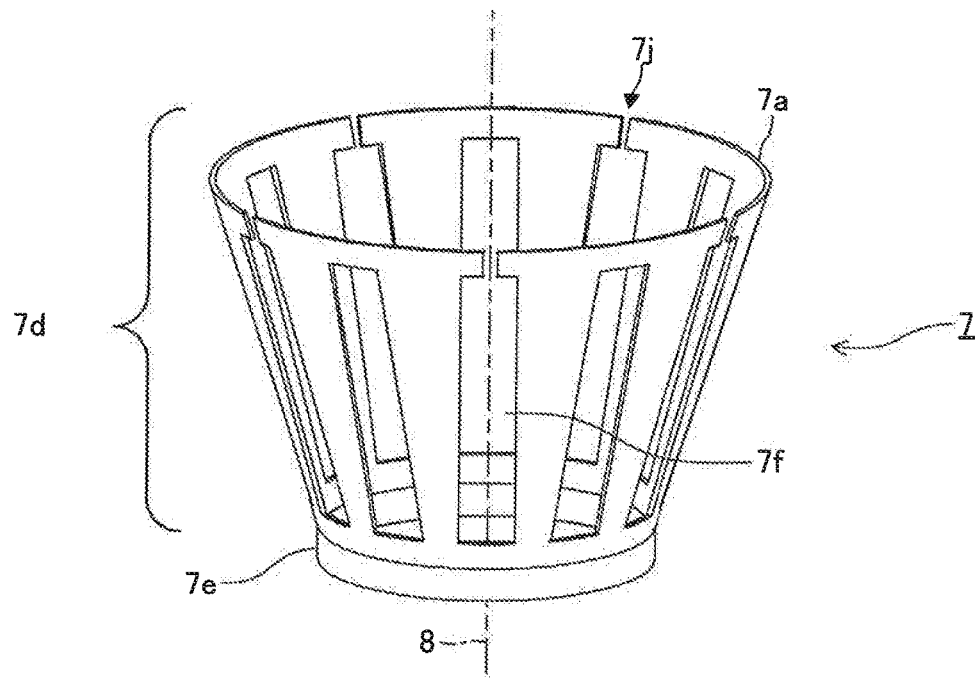
FIG. 7 is a schematic perspective view for showing an embodiment of a supporting member which comprises an energizing member according to the present invention.

FIG. 7 is a schematic perspective view for showing an embodiment of a supporting member which comprises an energizing member according to the present invention. The supporting member 7 exemplified in FIG. 7 has the same configuration as that of the supporting member 7 exemplified in FIG. 5, except for a point that the annular supporting surface 7a is divided into a plurality of segments by preparing clearances 7j which leads to the supporting surface 7a from a plurality of the through holes 7f formed in the side surface of the reverse truncated cone tubular member 7d at a plurality of positions. Moreover, it is preferable that the side surface of the reverse truncated cone tubular member 7d is formed of a material, such as spring steel, which can deform elastically, as mentioned above. In accordance with the above-mentioned configuration, the supporting surface 7a can be energized so as to approach the pressing member by the side surface of the reverse truncated cone tubular member 7d being warped elastically when the supporting surface 7a is pressed.

<Configuration Example 6 of Supporting Member>

Figure 8:
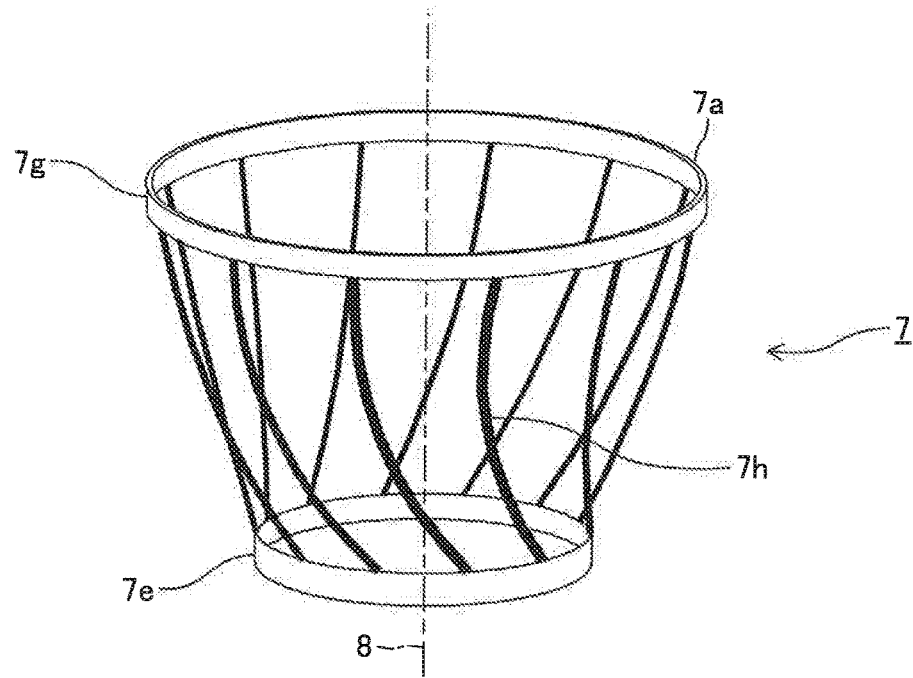
FIG. 8 is a schematic perspective view for showing another embodiment of a supporting member which comprises an energizing member according to the present invention.

FIG. 8 is a schematic perspective view for showing another embodiment of a supporting member which comprises an energizing member according to the present invention. The supporting member 7 exemplified in FIG. 8 has the same configuration as that of the supporting member 7 exemplified in FIG. 6 except for a point that the shape and layout of a plurality of the linear members 7h (bold solid lines) which connect the cylindrical member 7g which has the supporting surface 7a opposite to the diaphragm 2 and the cylindrical member 7e are different from each other. Specifically, in the supporting member 7 exemplified in FIG. 6, the linear members 7h have a linear shape corresponding to a generating line of a truncated cone tubular shape between the cylindrical member 7g and the cylindrical member 7e. On the contrary to this, the linear members 7h which constitute the supporting member 7 exemplified in FIG. 8 have a curved shape inclined to the above-mentioned generating line. Moreover, it is preferable that the linear members 7h are formed of a material, such as spring steel, which can deform elastically, as mentioned above.

By constituting the linear members 7h as mentioned above, as compared with the configuration of the linear members 7h shown in FIG. 6, the linear members 7h can be elastically deformed more easily and smoothly when the supporting surface 7a is pressed. In accordance with such a configuration, the supporting surface 7a can be energized so as to approach the pressing member by the linear members 7h being warped elastically when the supporting surface 7a is pressed.

Fifth Embodiment

As mentioned at the beginning, the present invention relates not only to a diaphragm valve, but also to a mass flow controller which uses the diaphragm valve according to the present invention. A mass flow controller according to a fifth embodiment of the present invention (which may be referred to as a "fifth apparatus" hereafter) is a mass flow controller which comprises a flow sensor and the diaphragm valve according to according to any one of the above-mentioned various embodiments of the present invention (present invention valve).

Figure 9:
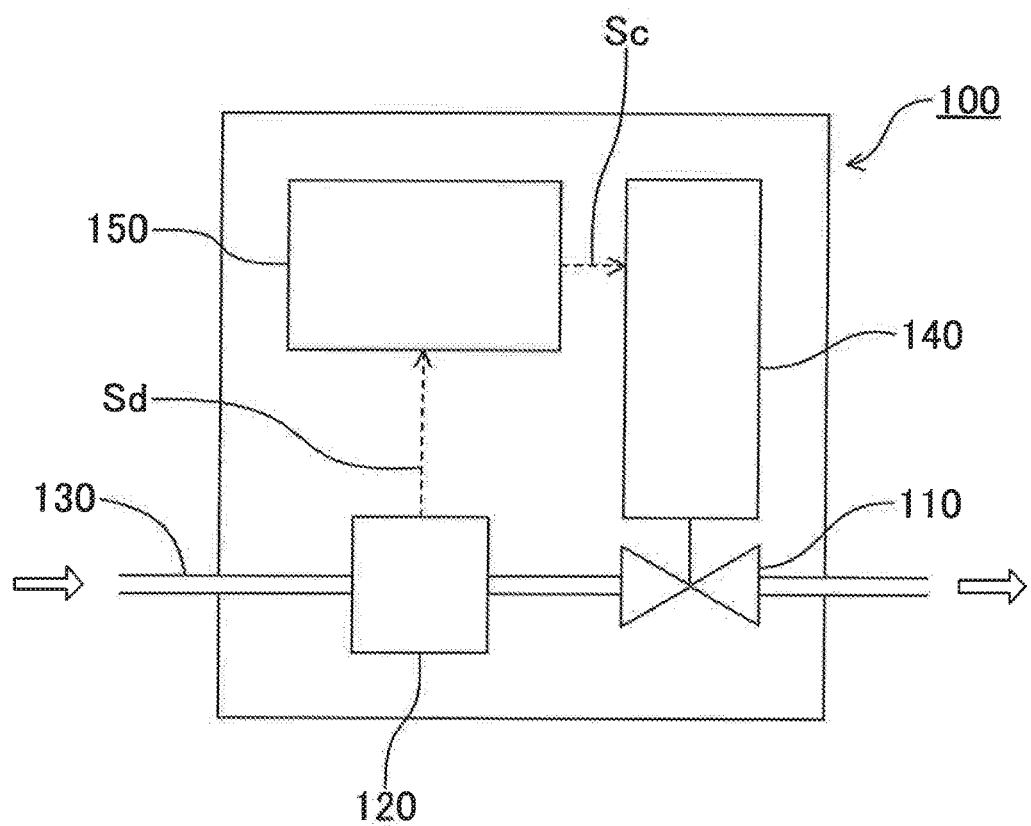
FIG. 9 is a schematic block diagram for showing an example of a configuration of a mass flow controller according to a fifth embodiment of the present invention (fifth apparatus).

FIG. 9 is a schematic block diagram for showing an example of a configuration of the fifth apparatus. FIG. 9 is a conceptual diagram for showing a logical relation among constituents of the fifth apparatus 100, and does not represent a physical spatial relation of respective constituents. As shown in FIG. 9, the fifth apparatus 100 comprises a present invention valve 110 and a flow sensor 120. In addition to the above, the fifth apparatus 100 exemplified in FIG. 9 further comprises a passage 130 through which a gas that is a target of mass flow control flows, a driving mechanism 140 configured so as to drive a pressing member (not shown) which the present invention valve 110 comprises, and a control part 150 which controls the driving mechanism 140 based on a flow rate of the gas detected by the flow sensor 120.

The flow sensor 120 is not limited in particular as long as it is possible to detect a mass flow rate of the gas which flows through the passage 130. As a specific example of such a flow sensor 120, a thermal type flow sensor, a pressure type flow sensor and a differential pressure type flow sensor, etc. can be mentioned, for example. Since configurations and operations of these flow sensors are well-known in the art, explanation thereof is omitted here.

The driving mechanism 140 is not limited in particular as long as it is possible to drive the pressing member to control a valve opening of the present invention valve 110. As mentioned above, a piezo-electric element driven with an electric voltage signal and a solenoid driven with an electric current signal, etc. can be mentioned as specific examples of such a driving mechanism 140, for example.

The control part 150 is configured so as to output a control signal Sc to the driving mechanism 140 to control a valve opening of the present invention valve 110 such that a mass flow rate of the gas measured based on a detection signal Sd output from the flow sensor 120 is in agreement with a set flow rate which is set up as a desired value. Such a function as the control part 150 can be realized by an electronic control unit (ECU), for example. The ECU comprises a microcomputer as its principal part, and comprises an input port for receiving the detection signal Sd from the flow sensor 120 and an output port for transmitting the control signal Sc to the driving mechanism 140, etc.

As mentioned above, in accordance with the present invention valve 110, the decrease in the distance d of the gap and the decrease in the flow rate of the gas can be reduced even when the pressure difference ΔP2 between both sides of the diaphragm is large, since the deformation (expansion) of the diaphragm, which is not shown, to the side of the secondary side passage is obstructed by the supporting member.

Therefore, for example, even in a case where both the pressure P1 of the gas in the primary side passage and the pressure P2 of the gas in the secondary side passage are low and the pressure P0 on the side of the driving mechanism for the diaphragm is equal to atmospheric pressure as mentioned above, decrease in the flow rate of the gas can be prevented. As a result, in accordance with the fifth apparatus 100, even in a situation where the secondary side passage is directly connected to a chamber of semiconductor manufacturing equipment, a gas having a low equilibrium vapor pressure can be stably supplied to semiconductor manufacturing equipment at a large flow rate.

REFERENCE SIGNS LIST

1: Diaphragm Valve (Present Invention)
2: Diaphragm
  2a: Bending Part
  2b: Position Which Can Contact with Supporting Surface of Supporting Member
3: Secondary Side Passage
4: Primary Side Passage
5: Valve Seat
  5a: Seating Surface
6: Pressing Member
  6a: Convex part
  6b: Opposite Surface
7: Supporting Member
  7a: Supporting Surface
  7b: Energizing Member
  7c: Junction with Valve Seat (Cut-out Part)
  7d: Reverse Truncated Cone Tubular Member
  7e: Cylindrical Member
  7f: Through Hole
  7g: Cylindrical Member
  7h: Linear Member
  7j: Clearance
8: Seating Axis
10: Diaphragm Valve (Conventional Technology)
100: Mass Flow Controller (Present Invention)
110: Diaphragm Valve (Present Invention)
120: Flow Sensor
130: Passage
140: Driving Mechanism
150: Control Part
d: Distance of Gap
r: Average Radius of Seating Surface
Sd: Detection Signal
Sc: Control Signal

The invention claimed is:

1. A diaphragm valve which comprises,
a circular diaphragm,
a valve seat constituted by a tubular member disposed coaxially with said diaphragm and having a seating surface formed on an end surface on the diaphragm side of said tubular member, and said seating surface being a plane having an annular shape on which said diaphragm is seated,
a primary side passage that is a space located outside said valve seat,
a secondary side passage that is a space located inside said valve seat, and
a pressing member configured so as to press said diaphragm to bring said diaphragm closer to said seating surface, and
a periphery part of said diaphragm is fixed at a reference position a predetermined distance apart from a seating plane that is a plane including said seating surface, and
said pressing member is configured so as to press said diaphragm and thereby change the distance between said diaphragm and said seating surface to change a valve opening of said diaphragm valve,
wherein:
said diaphragm valve further comprises a supporting member configured so as to contact with said diaphragm in a first opening range that is at least one part of a range of the valve opening within an entire opening range that is a range of the valve opening of said diaphragm valve from a fully opened state to a fully closed state to obstruct deformation of said diaphragm to the side of said secondary side passage, and
said supporting member is configured such that a supporting surface that is a surface of said supporting member, which contacts with said diaphragm in said first opening range, is located in a region between a seating center that is a center of the annular shape of said seating surface and said seating surface, in a normal projection to said seating plane.

2. The diaphragm valve according to claim 1, wherein:
said supporting surface is included in said seating plane.

3. The diaphragm valve according to claim 2, wherein:
said supporting member is configured such that a center of said supporting surface in a radial direction of the annular shape of said seating surface is located in a region whose distance from said seating center is 0.5r or more and 0.8r or less, in which r is an average radius that is an average of an outer radius and an inner radius of the annular shape of said seating surface, in a normal projection to said seating plane.

4. The diaphragm valve according to claim 2, wherein:
said supporting member is constituted by one planar member or two or more planar members including a seating axis that is an axis which intersects perpendicularly with said seating plane at said seating center.

5. The diaphragm valve according to claim 2, wherein:
said supporting surface has an annular shape formed coaxially with said seating surface, in a normal projection to said seating plane.

6. The diaphragm valve according to claim 5, wherein:
said tubular member constituting said valve seat is constituted by a cylindrical member and/or a truncated cone tubular member disposed coaxially with said diaphragm,
said supporting member is constituted by a cylindrical member and/or a truncated cone tubular member disposed coaxially with said tubular member, and a through hole is formed in a side surface of said cylindrical member or said truncated cone tubular member which constitutes said supporting member.

7. The diaphragm valve according to claim 1, wherein:
said pressing member is configured such that an opposite surface that is a surface of a region opposite at least to said supporting surface is located coplanarly with a region opposite to said seating surface, and
said supporting member comprises an energizing member which energizes said supporting surface toward said pressing member, and
said supporting member is configured such that said diaphragm is sandwiched between said supporting surface and said opposite surface by energization force from said energizing member.

8. The diaphragm valve according to claim 7, wherein:
said supporting member is configured such that a center of said supporting surface in a radial direction of the annular shape of said seating surface is located in a region whose distance from said seating center is 0.5r or more and 0.8r or less, in which r is an average radius that is an average of an outer radius and an inner radius of the annular shape of said seating surface, in a normal projection to said seating plane.

9. The diaphragm valve according to claim 7, wherein:
said supporting member is constituted by one planar member or two or more planar members including a seating axis that is an axis which intersects perpendicularly with said seating plane at said seating center.

10. The diaphragm valve according to claim 7, wherein:
said supporting surface has an annular shape formed coaxially with said seating surface, in a normal projection to said seating plane.

11. The diaphragm valve according to claim 10, wherein:
said tubular member constituting said valve seat is constituted by a cylindrical member and/or a truncated cone tubular member disposed coaxially with said diaphragm,
said supporting member is constituted by a cylindrical member and/or a truncated cone tubular member disposed coaxially with said tubular member, and
a through hole is formed in a side surface of said cylindrical member or said truncated cone tubular member which constitutes said supporting member.

12. The diaphragm valve according to claim 1, wherein:
said supporting member is configured such that a center of said supporting surface in a radial direction of the annular shape of said seating surface is located in a region whose distance from said seating center is 0.5r or more and 0.8r or less, in which r is an average radius that is an average of an outer radius and an inner radius of the annular shape of said seating surface, in a normal projection to said seating plane.

13. The diaphragm valve according to claim 12, wherein:
said supporting member is constituted by one planar member or two or more planar members including a seating axis that is an axis which intersects perpendicularly with said seating plane at said seating center.

14. The diaphragm valve according to claim 12, wherein:
said supporting surface has an annular shape formed coaxially with said seating surface, in a normal projection to said seating plane.

15. The diaphragm valve according to claim 14, wherein:
said tubular member constituting said valve seat is constituted by a cylindrical member and/or a truncated cone tubular member disposed coaxially with said diaphragm,
said supporting member is constituted by a cylindrical member and/or a truncated cone tubular member disposed coaxially with said tubular member, and
a through hole is formed in a side surface of said cylindrical member or said truncated cone tubular member which constitutes said supporting member.

16. The diaphragm valve according to claim 1, wherein:
said supporting member is constituted by one planar member or two or more planar members including a seating axis that is an axis which intersects perpendicularly with said seating plane at said seating center.

17. The diaphragm valve according to claim 1, wherein:
said supporting surface has an annular shape formed coaxially with said seating surface, in a normal projection to said seating plane.

18. The diaphragm valve according to claim 17, wherein:
said tubular member constituting said valve seat is constituted by a cylindrical member and/or a truncated cone tubular member disposed coaxially with said diaphragm,
said supporting member is constituted by a cylindrical member and/or a truncated cone tubular member disposed coaxially with said tubular member, and
a through hole is formed in a side surface of said cylindrical member or said truncated cone tubular member which constitutes said supporting member.

19. A mass flow controller comprising:
a flow sensor, and
a diaphragm valve comprising:
    a circular diaphragm,
    a valve seat constituted by a tubular member disposed coaxially with said diaphragm and having a seating surface formed on an end surface on the diaphragm side of said tubular member, and said seating surface being a plane having an annular shape on which said diaphragm is seated,
    a primary side passage that is a space located outside said valve seat,
    a secondary side passage that is a space located inside said valve seat, and
    a pressing member configured so as to press said diaphragm to bring said diaphragm closer to said seating surface, and
a periphery part of said diaphragm is fixed at a reference position a predetermined distance apart from a seating plane that is a plane including said seating surface, and
said pressing member is configured so as to press said diaphragm and thereby change the distance between said diaphragm and said seating surface to change a valve opening of said diaphragm valve,
wherein:
said diaphragm valve further comprises a supporting member configured so as to contact with said diaphragm in a first opening range that is at least one part of a range of the valve opening within an entire opening range that is a range of the valve opening of said diaphragm valve from a fully opened state to a fully closed state to obstruct deformation of said diaphragm to the side of said secondary side passage, and
said supporting member is configured such that a supporting surface that is a surface of said supporting member, which contacts with said diaphragm in said first opening range, is located in a region between a seating center that is a center of the annular shape of said seating surface and said seating surface, in a normal projection to said seating plane.

20. The mass flow controller according to claim 19, wherein:
said supporting surface is included in said seating plane.

21. The mass flow controller according to claim 20, wherein:
said supporting member is configured such that a center of said supporting surface in a radial direction of the annular shape of said seating surface is located in a region whose distance from said seating center is 0.5r or more and 0.8r or less, in which r is an average radius that is an average of an outer radius and an inner radius of the annular shape of said seating surface, in a normal projection to said seating plane.

22. The mass flow controller according to claim 20, wherein:
said supporting member is constituted by one planar member or two or more planar members including a seating axis that is an axis which intersects perpendicularly with said seating plane at said seating center.

23. The mass flow controller according to claim 20, wherein:
said supporting surface has an annular shape formed coaxially with said seating surface, in a normal projection to said seating plane.

24. The mass flow controller according to claim 23, wherein:
said tubular member constituting said valve seat is constituted by a cylindrical member and/or a truncated cone tubular member disposed coaxially with said diaphragm,
said supporting member is constituted by a cylindrical member and/or a truncated cone tubular member disposed coaxially with said tubular member, and
a through hole is formed in a side surface of said cylindrical member or said truncated cone tubular member which constitutes said supporting member.

25. The mass flow controller according to claim 19, wherein:
said pressing member is configured such that an opposite surface that is a surface of a region opposite at least to said supporting surface is located coplanarly with a region opposite to said seating surface, and
said supporting member comprises an energizing member which energizes said supporting surface toward said pressing member, and
said supporting member is configured such that said diaphragm is sandwiched between said supporting surface and said opposite surface by energization force from said energizing member.

26. The mass flow controller according to claim 25, wherein:
said supporting member is configured such that a center of said supporting surface in a radial direction of the annular shape of said seating surface is located in a region whose distance from said seating center is 0.5r or more and 0.8r or less, in which r is an average radius that is an average of an outer radius and an inner radius of the annular shape of said seating surface, in a normal projection to said seating plane.

27. The mass flow controller according to claim 25, wherein:
said supporting member is constituted by one planar member or two or more planar members including a seating axis that is an axis which intersects perpendicularly with said seating plane at said seating center.

28. The mass flow controller according to claim 25, wherein:
said supporting surface has an annular shape formed coaxially with said seating surface, in a normal projection to said seating plane.

29. The mass flow controller according to claim 28, wherein:
said tubular member constituting said valve seat is constituted by a cylindrical member and/or a truncated cone tubular member disposed coaxially with said diaphragm,
said supporting member is constituted by a cylindrical member and/or a truncated cone tubular member disposed coaxially with said tubular member, and
a through hole is formed in a side surface of said cylindrical member or said truncated cone tubular member which constitutes said supporting member.

30. The mass flow controller according to claim 19, wherein:
said supporting member is configured such that a center of said supporting surface in a radial direction of the annular shape of said seating surface is located in a region whose distance from said seating center is 0.5r or more and 0.8r or less, in which r is an average radius that is an average of an outer radius and an inner radius of the annular shape of said seating surface, in a normal projection to said seating plane.

31. The mass flow controller according to claim 30, wherein:
said supporting member is constituted by one planar member or two or more planar members including a seating axis that is an axis which intersects perpendicularly with said seating plane at said seating center.

32. The mass flow controller according to claim 30, wherein:
said supporting surface has an annular shape formed coaxially with said seating surface, in a normal projection to said seating plane.

33. The mass flow controller according to claim 32, wherein:
said tubular member constituting said valve seat is constituted by a cylindrical member and/or a truncated cone tubular member disposed coaxially with said diaphragm,
said supporting member is constituted by a cylindrical member and/or a truncated cone tubular member disposed coaxially with said tubular member, and
a through hole is formed in a side surface of said cylindrical member or said truncated cone tubular member which constitutes said supporting member.

34. The mass flow controller according to claim 19, wherein:
said supporting member is constituted by one planar member or two or more planar members including a seating axis that is an axis which intersects perpendicularly with said seating plane at said seating center.

35. The mass flow controller according to claim 19, wherein:
said supporting surface has an annular shape formed coaxially with said seating surface, in a normal projection to said seating plane.

36. The mass flow controller according to claim 35, wherein:
said tubular member constituting said valve seat is constituted by a cylindrical member and/or a truncated cone tubular member disposed coaxially with said diaphragm, said supporting member is constituted by a cylindrical member and/or a truncated cone tubular member disposed coaxially with said tubular member, and
a through hole is formed in a side surface of said cylindrical member or said truncated cone tubular member which constitutes said supporting member.

* * * * *